United States Patent

[11] 3,629,565

[72] Inventors Martin S. Schmookler Poughkeepsie; Arnold Weinberger, Newburgh, both of N.Y.

[21] Appl. No. 11,246

[22] Filed Feb. 13, 1970

[45] Patented Dec. 21, 1971

[73] Assignee International Business Machines Corporation Armonk, N.Y.

[54] DECIMAL ADDER FOR DIRECTLY IMPLEMENTING BCD ADDITION UTILIZING LOGIC CIRCUITRY

7 Claims, 12 Drawing Figs.

[52] U.S. Cl. .......... 235/174

[51] Int. Cl. .......... G06f 7/50

[50] Field of Search .......... 235/174

[56] References Cited

UNITED STATES PATENTS

| | | | |
|---|---|---|---|
| 3,304,418 | 2/1967 | Perotto et al. .......... | 235/174 X |
| 3,308,284 | 3/1967 | Grubb .......... | 235/174 |

OTHER REFERENCES

Schmookler & Weinberger Decimal Adder " IBM Technical Disclosure Bulletin" Vol. 12 No. 3 Aug. 1969 pp. 380–381.

Schmookler & Weinberger Decimal Adder Carry Circuits " IBM Technical Disclosure Bulletin" Vol. 12 No. 3 Aug. 1969 pp. 382–383.

W. S. Ang Parallel BCD Adder " IBM Technical Disclosure Bulletin" Vol. 4 No. 2 July 1961 pp. 41.

Kahn & Melan Magnetic Arithmetic Matrix Giving Simultaneous Results " IBM Technical Disclosure Bulletin" Vol. 4 No. 1 June 61 pp. 46–47

*Primary Examiner*—Malcolm A. Morrison

*Assistant Examiner*—David H. Malzahn

*Attorney*—Sughrue, Rothwell, Mion, Zinn & Macpeak

ABSTRACT: An improved method and logic system for adding two decimal numbers which are coded in a four-bit binary form. The method includes generating a propagate carry signal $P_i$ for each of the four bits which is the OR function of the bit inputs, generating a generate carry signal $G_i$ for each of the four bits which is the AND function of the bit inputs, and generating a binary carry $C_1$ for the first bit. The decimal carry for the addition is then generated by a novel carry look-ahead technique by employing these signals: $P_i$, $G_i$, and the binary carry $C_1$. The binary coded decimal bit signals representative of the decimal sum are also generated directly from these signals and, hence, the adder differs from prior art decimal adders which first performed binary addition in each bit and then added 6 to these binary sums whenever a decimal carry occurred so as to produce corrected binary signals representative of the coded decimal number. Several systems are disclosed employing this method and include a four-logic level, two-digit decimal adder, a three-logic level, two-digit decimal adder; and a six-logic level, eight-digit decimal adder. The six-logic level, eight-digit decimal adder combines concepts of the disclosed novel method for implementing decimal carries, as well as conventional group carry techniques used in parallel binary adders.

INVENTORS
MARTIN S. SCHMOOKLER
ARNOLD WEINBERGER

BY Sughrue, Rothwell, Mion, Zinn & Macpeak
ATTORNEYS

DECIMAL ADDER FOR DIRECTLY IMPLEMENTING BCD ADDITION UTILIZING LOGIC CIRCUITRY

BACKGROUND OF THE INVENTION

1. Field of the Invention

This invention relates to decimal adders and more particularly to decimal adders wherein the augend and addend are coded in a four-bit binary code commonly called BCD or the 8421-weighted code.

2. Description of the Prior Art

Decimal adders are well known in the prior art wherein the decimal numbers employed are represented in binary codes. Most decimal adders employ the 8421-weighted code because, with this code, simple binary addition techniques may be generally employed. This code allows a decimal number to be represented by binary signals; four bits are required to achieve full decimal representation from 0–9. Therefore, the decimal number 9 is represented by a 1 in the eight-order bit, and a 1 in the one-order bit, that is, 1001. A decimal adder employing such a code is disclosed in R. K. Richards, "Arithmetic Operations and Digital Computers" at page 210. As discussed therein, there are two inherent problems with this type of decimal adder which are not apparent in a pure binary system. The first problem is that a decimal carry signal should be sent from a first digit to the next higher order digit when the sum of the first digit is equal to or greater than 10, but such an indication cannot be obtained solely by a binary carry from the eight-order bit since a sum value of 10 or greater may also be indicated by various combinations of ones in the eight-, four-, two-, and one-order bits of the augend and addend. Another problem is that a binary carry from the eight-order bit has the effect of carrying 16 rather than the desired value of 10. As disclosed therein, a decimal adder normally includes the binary addition of each bit, the generation of a decimal carry, if any, from the binary sums so produced, and finally a correction to the binary sums so generated to produce corrected binary sums whenever a decimal carry has been produced. Basically, all decimal adders have followed this traditional design.

It is also known in the prior art of binary adders that a technique referred to as carry look-ahead is useful in reducing the number of logic levels necessary to effect the binary additions. Such a method is described in an article authored by A. Weinberger and J. L. Smith and entitled "A Microsecond Adder Using One Megacycle Circuitry" 1956, *IRE Transactions On Electronic Computers*, at page 65. This technique of carry look-ahead essentially allows the formation of a binary carry in a bit without the necessity of first forming the binary carry from the preceding bit. This allows a binary sum to be produced in a much faster fashion since the binary carries need not ripple through each binary bit of the binary adder.

SUMMARY OF THE INVENTION

Accordingly, it is an object of this invention to refine the techniques of binary carry look-ahead so that they may be employed in decimal adders.

Another object of the invention is to employ a novel carry look-ahead technique to produce a decimal carry without first producing the binary sums of each bit.

An additional object of the invention is to provide a decimal adder which obviates the necessity for producing the binary sums of each input bit.

A further object of this invention is to provide a method for generating the decimal carry in a decimal adder employing decimal numbers coded in a four-bit binary code wherein the decimal carry is generated from logic functions independently produced from the first bit inputs and from the remaining bit inputs.

The invention may thus be summarized as an improved method and logic system for performing decimal addition wherein the digits of the augend and the addend are each represented in an 8, 4, 2, 1, four-bit binary code. The system accepts as inputs the binary coded augend, addend, and a low-order input carry $C_{in}$. It basically generates a propagate carry signal $P_i$ for each bit, a generate carry signal $G_i$ for each bit and a binary carry $C_1$ from the first bit of the binary coded inputs, from which a decimal carry signal and the four-bit binary signals are generated at its output, thereby representing the decimal sum of the addition. The propagate signal $P_i$ for any bit $i$ is equal to $A_i+B_i$ where $A_i$ and $B_i$ are the binary coded inputs of the augend and addend respectively. The generate signal $G_i$ for any bit $i$ is equal to $A_iB_i$. The binary carry $C_1$ is conventionally generated and equals $G_1+P_1C_{in}$. The decimal carry is generated from logic functions produced from the propagate and generate signals from the eight-, four-, and two-order bits, and from the binary carry from the first bit. Thus, the decimal carry is generated by grouping the 8, 4, 2, 1 group into two groups, that is, a first group comprising the eight-, four-, two-order bits and a second group comprising the one-order bit. The binary signals representing the sum of the decimal addition in a four-bit form are formed directly from the propagate and generate signals of each bit rather than performing binary addition and then adding six to correct these binary sum signals whenever a decimal carry has been made.

DESCRIPTION OF THE PREFERRED EMBODIMENT

Figure 1:
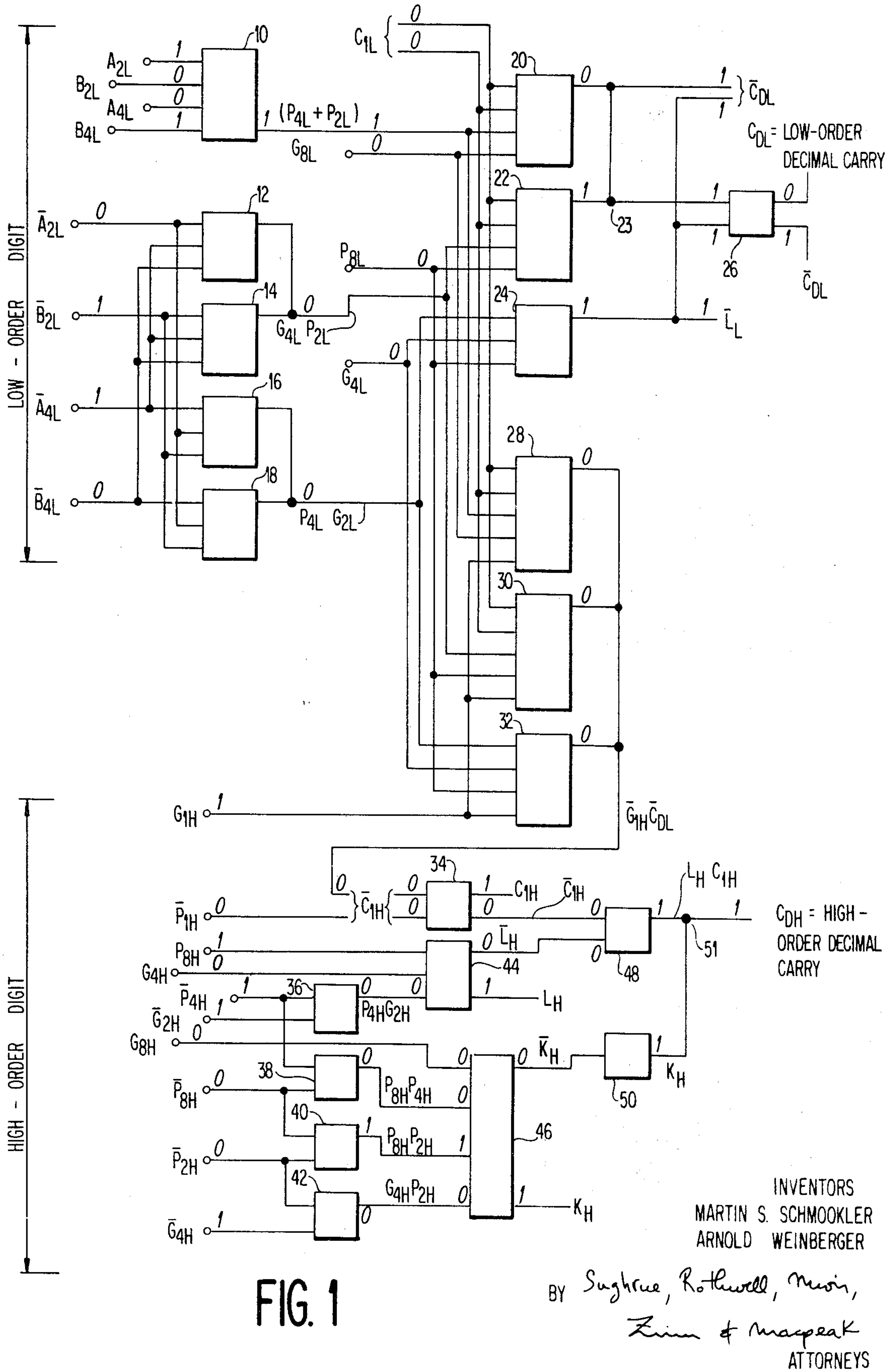
FIG. 1 illustrates an implementation of the decimal carries in a four-logic level, two-digit decimal adder.
Figure 2:
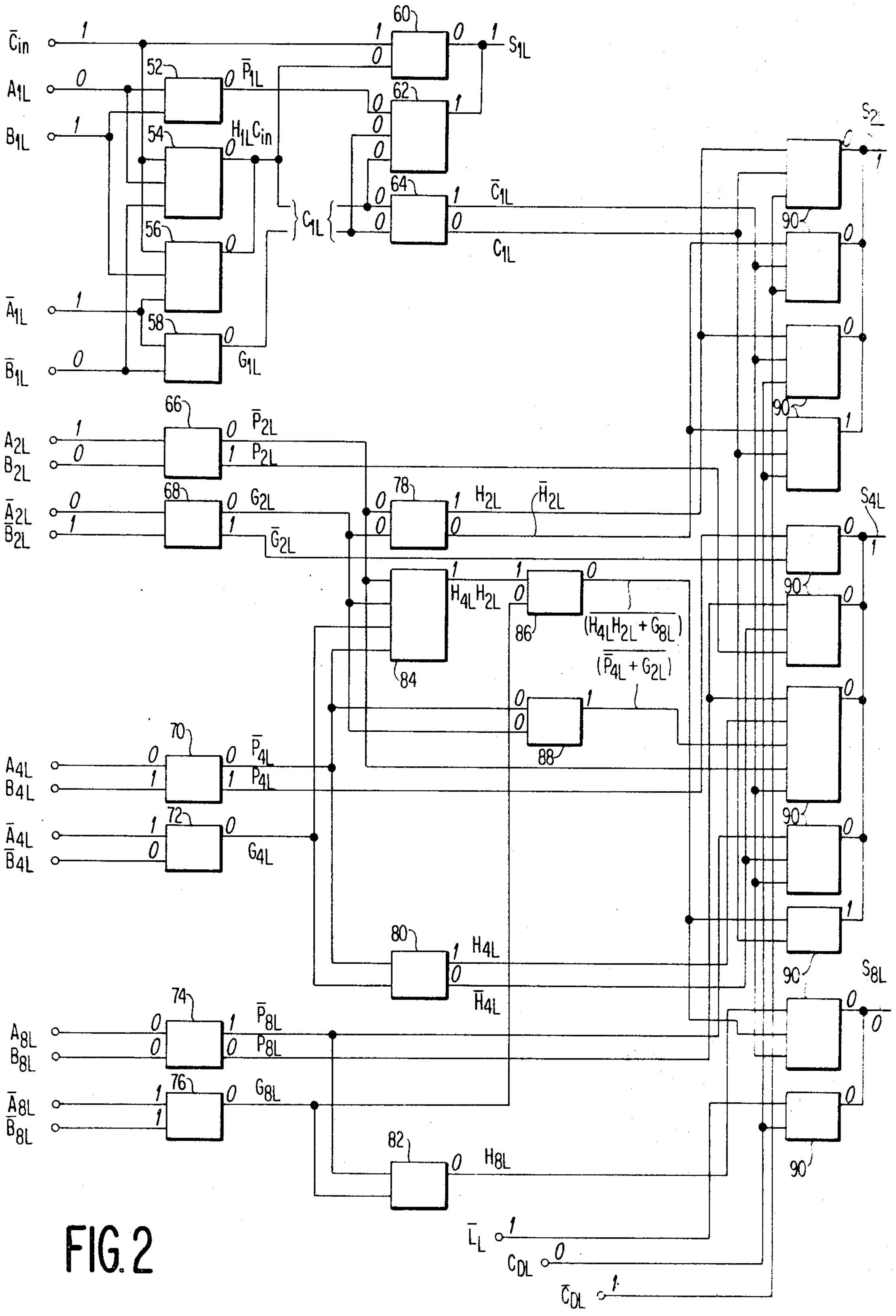
FIG. 2 illustrates an implementation of the binary coded signals representing the decimal sum of the lower digit in a four-logic level, two-digit decimal adder.
Figure 3:
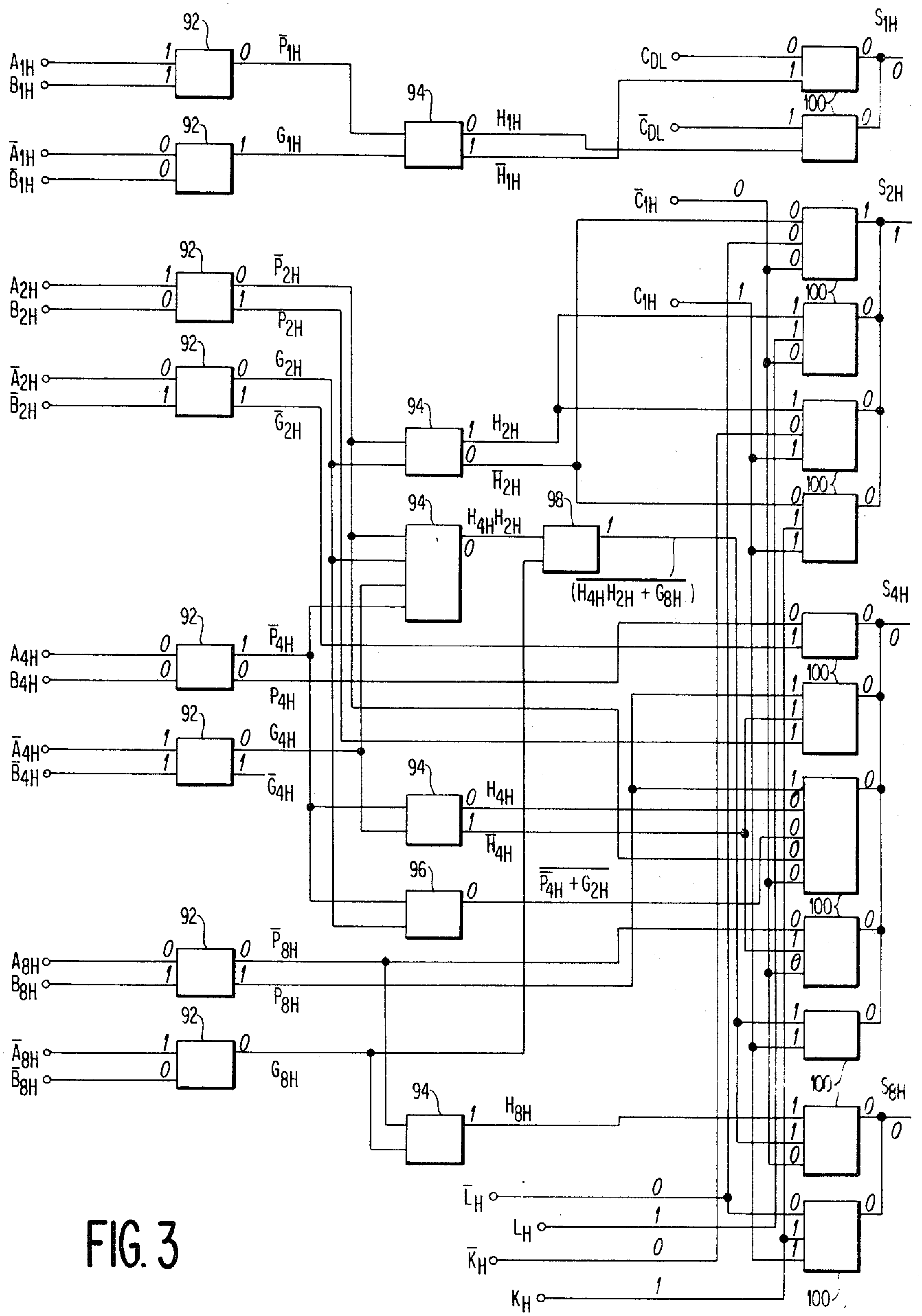
FIG. 3 illustrates a logic implementation of the binary signals representing the decimal sum of the high-order digit in a four-logic level, two-digit decimal adder.

FIGS. 1, 2 and 3 illustrate a four-logic level, two-digit decimal adder which implements the techniques of the present invention. Since it is a two-digit adder, it may employ any two-digit decimal numbers as inputs, for example 31 and 65. Hereinafter, the two digits will be referred to as a high-order and a low-order 1. The low-order digit is the decimal one-order digit and the high-order digit is the decimal 10-order digit. Both the low- and high-order digits are coded in a four-bit binary code comprising an eight-,four-,two- and a one-order bit. Therefore, the decimal numbers 4 and 7 are represented in a binary code as 0100, and 0111, respectively. Hereinafter, the low-order augend bits will be represented by $A_{iL}$ terms, the low-order addend bits by $B_{iL}$ terms, the high-order augend bits by $A_{iH}$ terms, and the high-order addend by $B_{iH}$ terms.

FIG. 1 illustrated the circuitry for generating the decimal carries of both the high- and low-order decimal digits. FIG. 2 illustrates the logic circuitry for developing the sum of the low-order digits of the augend and addend. FIG. 3 illustrates the logic circuitry for generating the sum of the high-order digits of the augend and addend. The logic circuits employed are conventional; they have emitter follower outputs and the top output generates the NOR function of the inputs and the bottom output produces the OR function of the inputs. In addition, the NOR output functions may be externally wired together at their outputs to produce the OR function. This is commonly referred to as wire-OR-ing or emitter dotting, since the emitters of the logic output transistors are connected together. In referring to an adder comprising a number of logic levels, emitter dotting is not considered a logic level. Therefore, the four-bit binary coded decimal numbers $A_{iL}$, $B_{iL}$, $A_{iH}$ are inputs at the first level and the generated sum is produced at the outputs of the fourth level.

FIG. 1 illustrates an implementation of the high- and low-order decimal carries generated in accordance with the present invention. As stated above, it is an object of this invention to produce the decimal carries for each digit without the necessity for generating the binary carries of each bit. More particularly, the decimal carry is to be generated from the generate carry signals, the propagate carry signals, and the binary carry signal from the first bit of the digit, where a propagate carry signal $P_i$ represents the propagate signal for any bit $i$ and equals $A_i+B_i$, and $G_i$ represents any bit-generate carry signal and equals $A_iB_i$. Thus, it can be seen tat $G_i$ will be positive only when $A_i$ and $B_i$ are positive, that is, whenever a binary carry is generated in bit $i$. The propagate carry signals, $P_i$, will be positive whenever either $A_i$ or $B_i$ is positive, that is, when either$A_i$ or $B_i$ are ones. This is called a propagate signal since each bit having a positive propagate signal will transmit, or propagate, an input carry from a lower bit to the next higher bit. As can be seen from FIGS. 2, and 3, the propagate and generate signals are generated at the first level of the logic circuitry from the four-bit binary coded inputs, $A_{1L}$, $A_{2L}$, $A_{4L}$, $A_{8L}$, being the augend digit, $B_{1L}$, $B_{2L}$, $B_{4L}$, $B_{8L}$ being the addend of the lower-order decimal digit and $A_{1H}$, $A_{2H}$, $A_{4H}$, $A_{8H}$, being the augend of the higher order decimal digit nd $B_{1H}$, $B_{2H}$, $B_{4H}$, $B_{8H}$, being the addend of the higher order decimal digit. The binary carry of the first bit, $C_1$, is also produced at the first level as shown in FIG. 2. It is logically determined from the equation $C_1=G_1+P_1C_{in}$ where $_{in}$ is the low-order input carry from a previous addition.

The operation of FIG. 1 can best be understood by a mathematical analysis of the generaton of a decimal carry. A decimal carry, $C_d$, should be produced whenever the four-bit binary code equals 10 or more or whenever the four-bit binary code equals 9 and there is a decimal carry from the next lower order digit. This truism is represented by the following equation:

$$C_d=[A_8B_8+A_8B_4+A_8B_2+B_8A_4+B_8A_2+A_8A_1B_1+B_8A_1B_1+A_4B_4A_2+A_4B_4B_2+A_4B_4A_1B_1+A_4A_2B_2A_1B_1+B_4A_2B_2A_1B_1]+[A_8A_1+A_8B+B_8A_1+B_8B_1+A_4B_4A_1+A_4B_4B_1+A_4A_2B_2A_1+A_4A_2B_2B_1+B_4A_2B_2A_1+B_4A_2B_2B_1]\,C_{d-1}$$

The first term in this equation represents all those combinations of input bit values which would yield a binary coded decimal number of 10 or greater and the second term in the equation represents those combinations which would yield the sum of 9 in combination with a decimal carry $C_{d-1}$ from the next lowest order digit. This equation can be solved and grouped as follows:

$$C_d=[G_8+P_8P_4+P_8P_2+P_8G_1+G_4P_2+G_4G_1+P_4G_2G_1]+[P_8P_1+G_4P_1+P_4G_2P_1]C_{d-1}=[G_8+P_8P_4+P_8P_2+G_4P_2]+[P_8+G_4+P_4G_2][G_1+P_1C_{d-1}]$$

By substituting variables, this equation can be expressed as:

$C_d=K+LC_1+(K+L)(K+C_1)=L(K+C_1)$ where $C_1$ is the binary carry from the first bit and equals $G_1+P_1C_{d-1}$, $K=G_8+P_8P_4+P_8P_2+G_4P_2$, and $L=P_8+G_4+P_4G_2$. The solution to this equation can be easily confirmed since it is easily seen that $K$ will be positive only when the decimal sum of the eight-, four-, and two-order bits is 10 or greater, and $L$will be positive only when the decimal sum of the eight-, four-, and two-order bits is 8 or greater, and $C_1$ means there has been a binary carry from the first bit, that is, the value of 2 is added to the value of $L$ to yield a sum 10 or greater. Therefore, to implement the solution in this equation, the four-bit binary code 8, 4, 2 and 1 can be grouped in two groups consisting of the eight-, four-, two-order bits and the one-order bit, since K and L are dependent solely upon the generate and propagate signals from the eight-, four-, and two-order bits and $C_1$ is dependent only upon the inputs to the one-order bit.

Referring now more specifically to FIG. 1, it can be seen how this equation has been implemented. The propagate and generate signals for each bit of each digit are generated as illustrated in the first level in FIGS. 2 and 3 and will be more fully explained later. Starting with the upper portion of the FIG. which represents the generation of the lower order decimal carry $C_{dL}$, it can be seen that the logic gate 10 generates the function $P_{4L}+P_{2L}$ by OR'ing its inputs $A_{2L}$, $B_{2L}$, $A_{4L}$, $B_{4L}$. The function $G_{4L}P_{2L}$ is generated by OR'ing the OR'-ing of gates 12 and 14 by emitter dotting. Similarly, the function $P_{4L}G_{2L}$ is generated by OR'ing the outputs of gates 16 and 18. The gates 20 and 22 and the emitter dot 23 generate the function $\overline{K_L}\overline{C_{1L}}$ and the ate 24 generates the function $\overline{L_L}$. These functions are inputs to the gate 2 which generates the low-order decimal carry $C_{dL}$ according to the equation $\overline{C_{dL}}=\overline{L_L}+\overline{K_L}\overline{C_{1L}}$. Here it should be noted that the low-decimal carry $C_{dL}$ has been generated from the logic function $K_L$ and $L_L$ derived from the propagate and generate signals of the eight-, four-, and two-order bits and from the binary carry $C_1$ from the one-order bit. Thus, there has been a grouping of the eight-, four-, two-order, one-order bits into two groups, one comprising the eight-, four-, and two-order bits, and the second comprising the one-order bit.

The high-order decimal carry $C_{dH}$ is similarly generated. The gates 28, 30 and 32 generate the function $\overline{G_{1H}}\overline{C_{dL}}$ which is used in gate 34 to generate the binary carry of the first bit of the higher order digit $C_{1H}$. The gates 36, 38, 40, 42 generate, respectively, the functions $P_{4H}G_{2H}$, $P_{8H}P_{4H}$, $P_{8H}P_{2H}$, and $G_{4H}P_{2H}$. The gates 44 and 46 then generate the $K_H$ and $L_H$ functions. The gate 48 NOR's the $\overline{L_H}$ and $\overline{C_{1H}}$ functions to generate the $L_HC_{1H}$ function and the gate 50 is similarly used to generate the $K_H$ function. These outputs are then OR'ed by the emitter dot 51 to generate the high-order decimal carry $C_{dH}$.

Now turning to the development of the bit sum signals for each digit as illustrated in FIGS. 2 and 3, a few definitions are in order before discussing the development of the equations. The half-sum signal of bit $i$ is $H_i=\overline{A_i}B_i+A_i\overline{B_i}=\overline{G_i}P_i=$ $$\overline{G_i+\overline{P}_i};\ S_{ib}$$

is the uncorrected binary sum of a bit $i$; and $S_i$ is the corrected sum signal of bit $i$ and is necessary since the binary sum signals must be corrected whenever a decimal carry is made. In prior art decimal adders, this correction was normally made by adding 6. The corrected sum signal of the first bit, $S_1$ equals the binary sum of the first bit, $S_{1b}$, since a decimal carry will not affect this bit. Using the half-sum signal of the first bit, this sum signal may be generated by employing the equation:

$$S_1=\overline{H}_1C_{in}+H_1\overline{C}_{in}+(\overline{H}_1=\overline{C}_{in})C_{in}+P_1\overline{C}_1.$$

The two order bit corrected sum signal, $S_2$, should be 1 whenever the decimal sum is 2, 3, 6, 7, 12, 13, 16, and 17. This can be represented in equation form as:

$$S_2=\overline{S}_{2b}C_{dL}+S_{2b}\overline{C}_{dL}$$

which then in turn equals $S_2=\overline{H}_2\overline{C}_1C_{dL}+H_2C_1C_{dL}+\overline{H}_2C_1\overline{C}_{dL}+H_2\overline{C}_1\overline{C}_{dL}$. The four-order bit corrected sum signal, $S_4$, should be one when the binary value of $A_8$, $B_8$, $A_4$, $B_4$, $A_2$, $B_2$, $C_1$ totals 4, 5, 6, 7, 14, 15, 16 or 17. This can be represented in equation form as:

$$S_4=\overline{P}_8\overline{P}_4P_2C_1+\overline{P}_4G_2+\overline{P}_8H_4\overline{P}_2+H_4H_2\overline{C}_1+\overline{P}_8G_4G_2C_1+P_8H_4C_1+G_8\overline{C}_1=\overline{P}_4G_2+\overline{P}_8H_4\overline{P}_2+\overline{P}_8\overline{H}_4(\overline{P}_4+G_2)P_2C_1+P_8H_4C_1+(H_4H_2+G_8)\overline{C}_1$$

The eight-order bit corrected sum signal, $S_8$, should be one if the decimal sum is 8, 9, 18, 19, and thus can be represented in equation form:

$$S_8=\overline{G}_8C_1+(C_4+P_8)\overline{C}_d=G_8C_1+(G_4+P_4G_2+P_4P_2C_1+P_8)\overline{C}_d=G_8C_1+P_4P_2C_1\overline{C}_d+L\overline{C}_d=G_8C_1+P_4P_2C_1(\overline{L}+\overline{K}\overline{C}_1)+L\overline{C}_d=(G_8+P_4P_2\overline{L})C_1+L\overline{C}_d=(G_8+\overline{P}_8H_4H_2)C_1+L\overline{C}_d=\overline{H}_8(H_4H_2+G_8)C_1+L\overline{C}_d,$$

where $C_d$ refers to the decimal carry from the same decimal digit.

Referring now to FIG. 2, it can be seen how these equations are implemented in generating the sum of the low-order digits. The gates 52, 54, 56, 58 generate the functions $\overline{P}_{1L}$, $H_{1L}C_{in}$, and $G_{1L}$ from the inputs $A_{1L}$, $B_{1L}$, $\overline{A}_{1L}$, $\overline{B}_{1L}$ and $\overline{C}_{in}$. The gates 60 and 62 then employ these functions as inputs to generate the first bit sum signal, $S_{1L}$, as an output. The gate 64 develops the function $C_{1L}$ from the inputs $H_{1L}C_{in}$ and $G_{1L}$. The gates 66, 68, 70, 72, 74, 76, generate the propagate and generate carry signals for the second, third and fourth bit. In the second level, the gates 78, 80 and 82 generate the half-sum signal for these bits and the gate 84 generates the function $H_{4L}H_{2L}$. In the third level of logic, the gates 86 and 88 generate the functions $\overline{H_{4L}H_{2L}+G_{8L}}$ and $$\overline{\overline{P}^{4}{}_{4L}+G_{2L}}$$

The binary coded signals representing the decimal sum are generated in the fourth level by the logic gates 90 from these functions produced in the first, second and third levels and the functions $\overline{L}_L$ and $C_{dL}$ which are generated by the decimal carry circuitry as illustrated in FIG. 1 and explained above.

FIG. 3 illustrates the generation of the binary coded bit signals representing the sum of the high-order decimal digits. The equations employed are substantially the same as those used in the generation of the bit sum signals for the lower order decimal digits. The first level logic gates 92 generate the propagate and generate signals from the four-bit binary coded inputs. In the second level, the gates 94 generate the half-sum signals for each bit and the gate 96 generates the function $$\overline{\overline{P}_{4H}+G_{2H}}$$

In the third level the gate 98 generates the function $\overline{H_{4H}H_{2H}+G_{8H}}$. In the fourth level gates 100 generate the binary coded bit signals. The first bit signal, $S_{1H}$, is generated by employing the decimal carry $C_{dL}$ from the lower order digit. The functions $L_H$ and $K_H$ are derived from the decimal carry circuit as illustrated in FIG. 1 and explained above.

The sample input and output values shown in FIGS. 1, 2 and 3 illustrate the addition of 32 and 95 as follows:

| | | High Order | | | | | Low Order | | | |
|---|---|---|---|---|---|---|---|---|---|---|
| | | $A_{8H}$ | $A_{4H}$ | $A_{2H}$ | $A_{1H}$ | | $A_{8L}$ | $A_{4L}$ | $A_{2L}$ | $A_{1L}$ |
| 32 | | 0 | 0 | 1 | 1 | | 0 | 0 | 1 | 0 |
| + 95 | | $B_{8H}$ | $B_{4H}$ | $B_{2H}$ | $B_{1H}$ | | $B_{8L}$ | $B_{4L}$ | $B_{2L}$ | $B_{1L}$ |
| 127 | | 1 | 0 | 0 | 1 | | 0 | 1 | 0 | 1 |
| | | $S_{8H}$ | $S_{4H}$ | $S_{2H}$ | $S_{1H}$ | | $S_{8L}$ | $S_{4L}$ | $S_{2L}$ | $S_{1L}$ |
| | $C_{dH}$ | | | | | $C_{dL}$ | | | | |
| | 1 | 0 | 0 | 1 | 0 | | 0 | 1 | 1 | 1 |

The digital value of 32 is represented in four-bit binary form by placing the value of 3 in the higher order digit and a value of 2 in the lower order digit. Thus, $A_{2H}$ and $A_{1H}$ and $A_{2L}$ are ones and the remaining $A_i$ values are zero. In a similar fashion the digital value 95 is represented by the $B_i$ values. These four-bit binary coded decimal numbers are inputs to the decimal carry circuit, the low-order decimal digit circuit, and the high-order decimal digit circuit as shown in FIGS. 1, 2 and 3. These values are then processed as described above in each level of each circuit to yield a one value in the higher order decimal carry $C_{dH}$, in the two-order bit $S_{2H}$ of the high-order digit circuit, and in the four-, two- and one-order bits $S_{4L}$, $S_{2L}$, and $S_{1L}$ of the low-order decimal digit circuit. The remaining outputs are zeros. Thus, in four-bit binary coded form this represents the decimal value of 127, the sum of 32 and 95 as desired.

Figure 4:
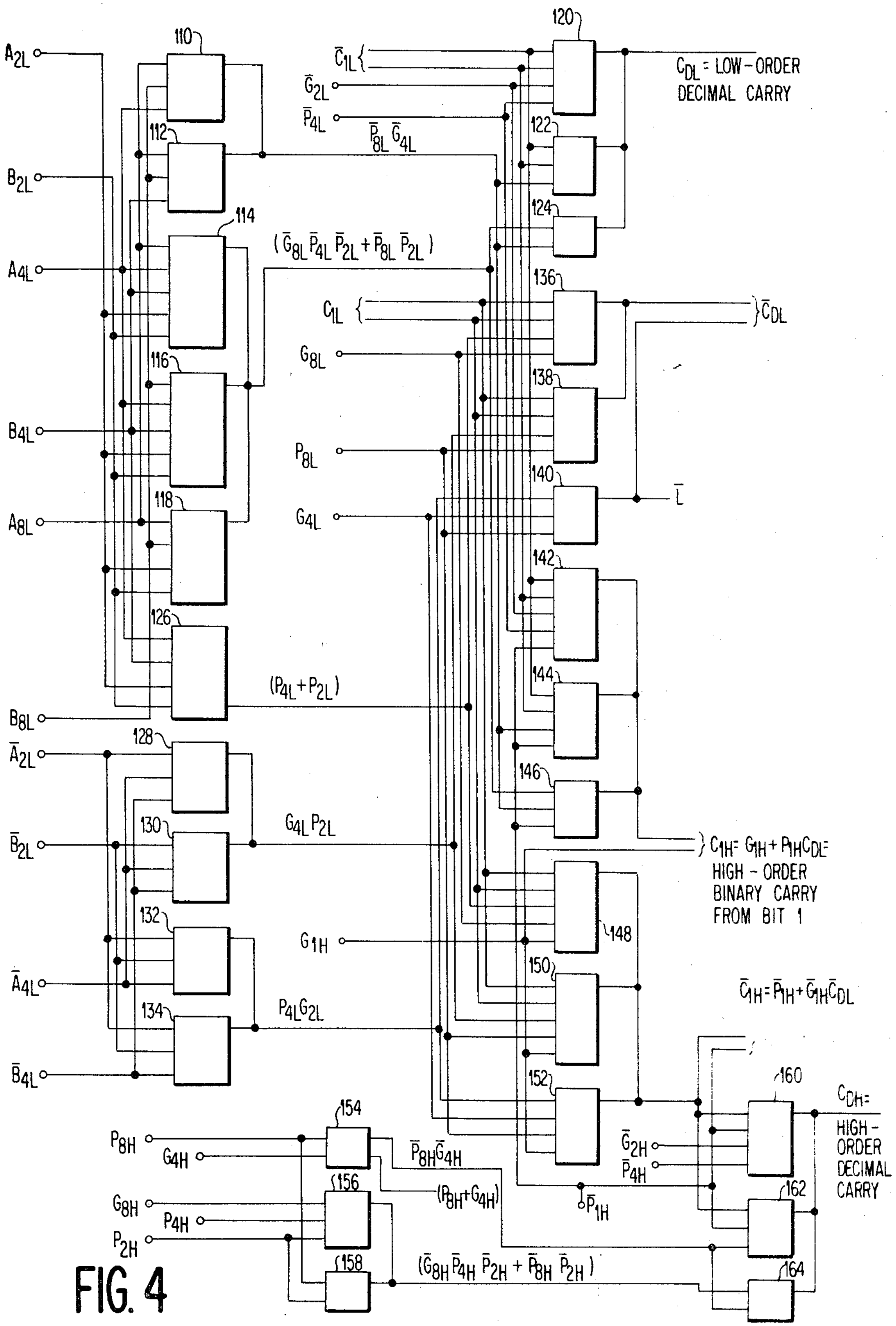
FIG. 4 illustrates a logic implementation of the decimal carries in a three-logic level, two-digit decimal adder.
Figure 5:
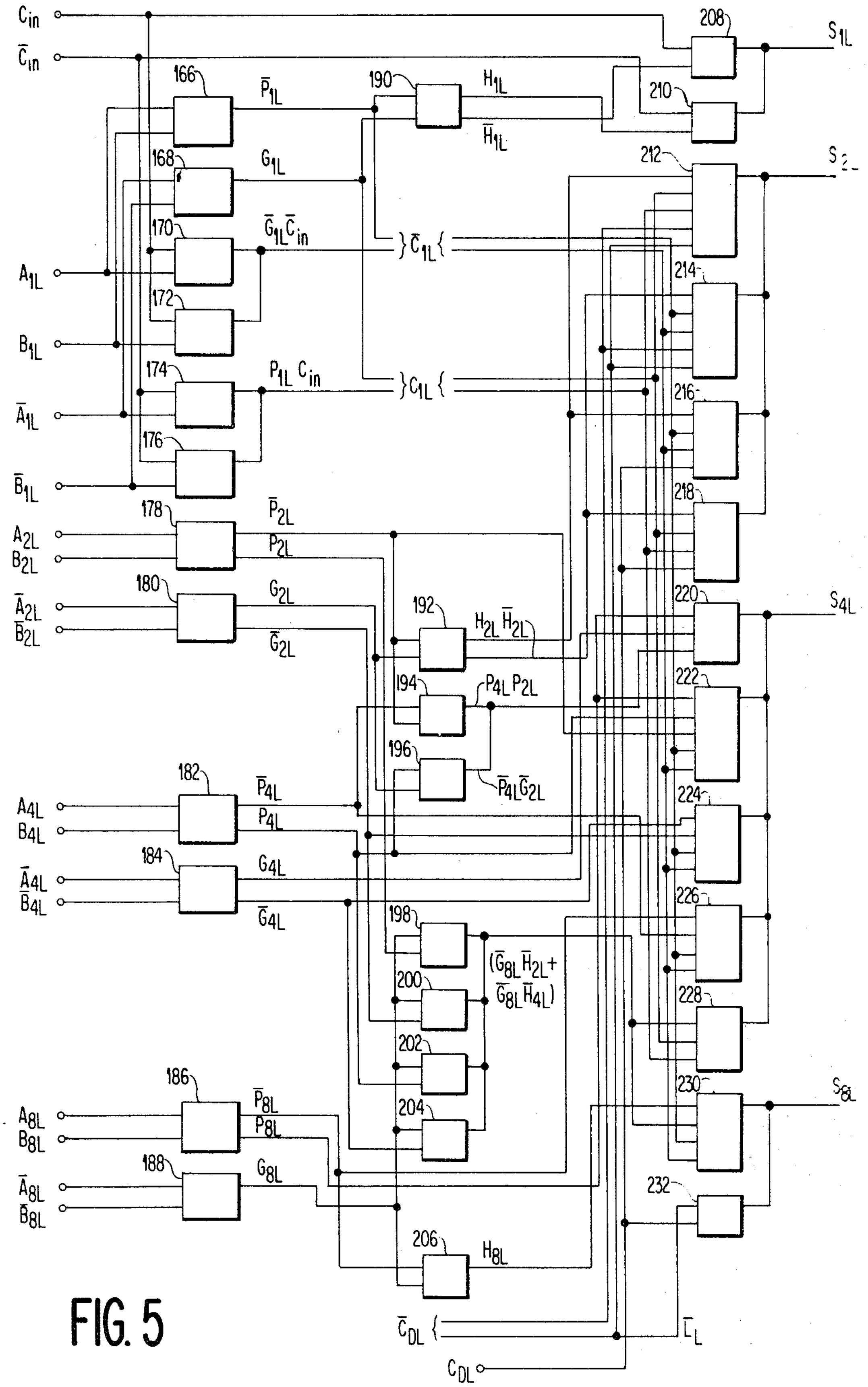
FIG. 5 illustrates an implementation of the binary signals representing the decimal sum of the lower order digits in a three-logic level, two-digit decimal adder.
Figure 6:
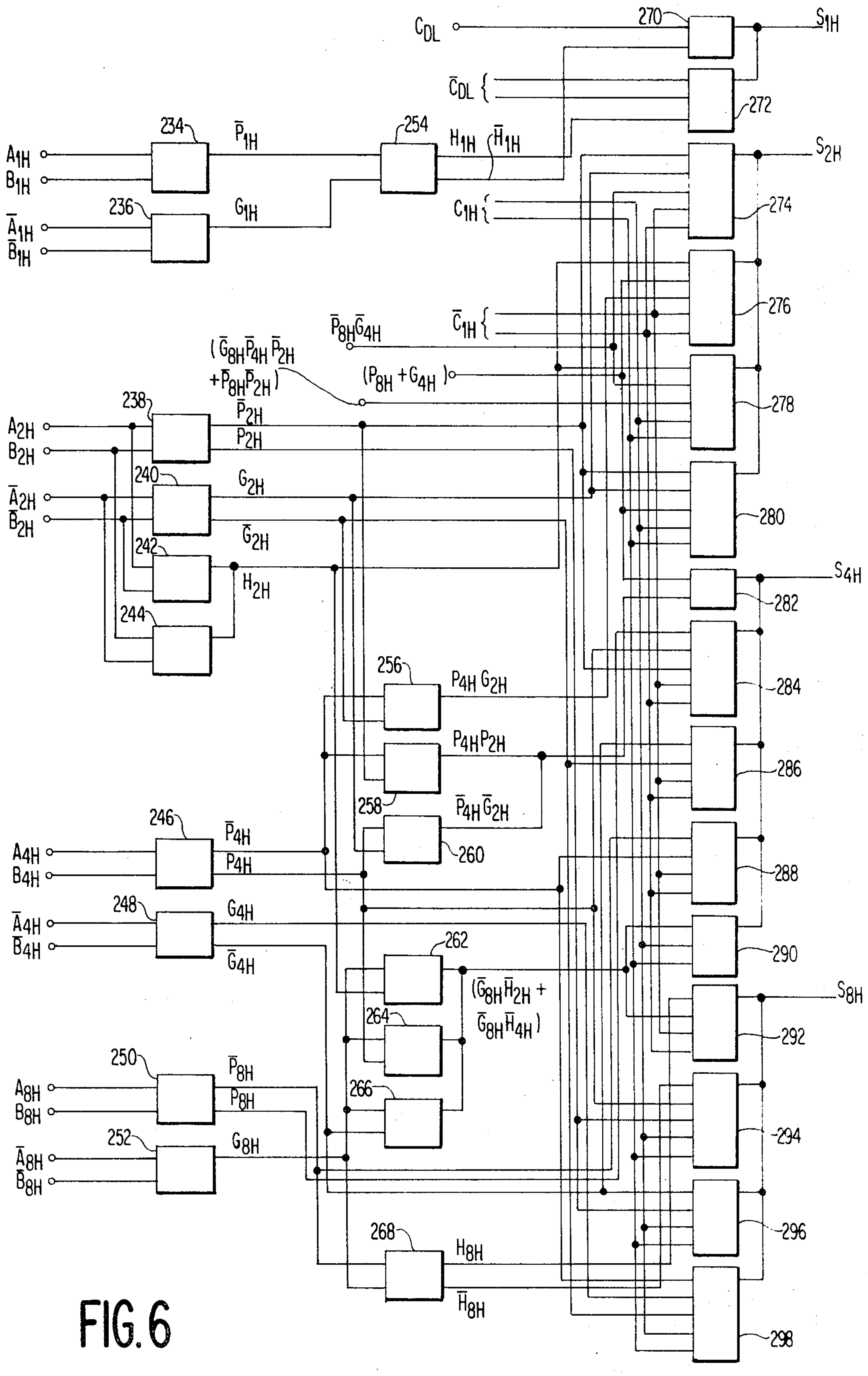
FIG. 6 illustrates a logic implementation of the binary signals representing the decimal sum of the high-order digits in a three-logic level, two-digit decimal adder.

FIGS. 4, 5 and 6 illustrate a three logic level, two-digit decimal adder. It is similar to the above described four-logic level, two-digit decimal adder, differing essentially in that the binary coded bit signals and the decimal carries are generated after three levels of logic rather than four. The overall operation and the type of logic gates employed are identical to the four-level adder. Again, the decimal inputs and outputs are coded in a four-bit binary form.

FIG. 4 illustrates the circuitry necessary to generate the high- and low-order decimal carries. The logic gates 110 and 112 generate the function $\overline{P}_{8L}\overline{G}_{4L}$ from the input four-bit binary coded augend and addend signals. The logic gates 114–118 generate the function $\overline{G}_{8L}\overline{P}_{4L}\overline{P}_{2L}+\overline{P}_{8L}\overline{P}_{2L}$. These functions are then used in combination with the values $C_{1L}$, $\overline{G}_{2L}$, and $\overline{P}_{4L}$, which are generated in the low-order decimal digit circuitry shown in FIG. 5, in the logic gates 120–124 to generate the lower order decimal carry $C_{dL}$. The logic gates 136–140 are employed to generate the inverse of $C_{dL}$. The logic gates 142–146 are used to generate the function $P_{1H}C_{dL}$ which in combination with $G_{1H}$ represents the binary carry from the first bit $C_{1H}$ of the high order digit. The logic gates 148–152 generate the inverse of $C_{1H}$. The logic gates 154–164 employ the generate and propagate functions from the two-, four- and eight-order bits and $C_{1H}$ to generate the high-order decimal carry $C_{dH}$.

FIG. 5 illustrates the three-level logic necessary to generate the low-order decimal sum. The equations to be implemented are derived as described above and are similar to those employed in the four level adder. They are as follows:

$$S_1=\overline{H}_1C_{in}+H_1\overline{C}_{in} \quad S_2=\overline{H}_2\overline{C}_1C_{dL}+H_2C_1C_{dL}+\overline{H}_2C_1\overline{C}_{dL}+H_2\overline{C}_1\overline{C}_{dL}$$

$$S_4=\overline{P}_8\overline{G}_4(\overline{P}_4+\overline{P}_2)(P_4+G_2)+P_8P_4P_2C_1+G_4G_2C_1+P_8P_4C_1+(G_8+H_2)(G_8+H_4)\overline{C}_1 \quad S_8=\overline{H}_8(\overline{G_8+H_2})(\overline{G_8+H_4})C_1+L\overline{C}_{dL}$$

The first column of logic circuits 166–188 are employed to generate the propagate and generate signals for each bit as well as the binary carry from the first bit. The second column of logic gates 190–206 are employed to generate the half-sum signals $H_i$ as well as the functions $P_{4L}P_{2L}$, $\overline{P}_{4L}\overline{G}_{2L}$, $\overline{G}_{8L}\overline{H}_{2L}+\overline{G}_{8L}\overline{H}_{4L}$. These functions, in addition to the lower order carry $C_{dL}$ as generated in the circuitry shown in FIG. 4, are employed in the third level logic gates 208–232 to generate the binary coded decimal sum signals $S_{1L}$, $S_{2L}$, $S_{4L}$ and $S_{8L}$.

FIG. 6 illustrates the logic circuitry employed to generate the high-order decimal sum. The equations to be implemented are derived similarly to that of the four-level adder described above and are identical to those used in the low-order digit except for the two- and eight-order sum signals which are:

$$S_2=H_2(P_8+G_4)C_1+\overline{H}_2(\overline{P}_8\overline{G}_4)(\overline{P}_4+\overline{G}_2)C_1+\overline{H}_2(P_8+G_4)(P_8+P_2)(G_8P_4+P_2)\overline{C}_1+H_2(\overline{P}_8\overline{G}_4)\overline{C}_1$$

$$S_8=\overline{H}_8(G_8+H_2)(G_8+H_4)C_1+H_8\overline{P}_4\overline{P}_2\overline{C}_1+G_4\overline{P}_2\overline{C}_1+H_4G_2\overline{C}_1.$$

The first level comprising logic gates 234–252 generates the propagate and generate signals for each bit as well as the half-sum signal for the two-order bit $H_{2H}$. The logic gate 254 generates the half-sum signal for the first bit $H_{1H}$. The logic gates 256–260 generate the functions $P_{4H}G_{2H}$, $P_{4H}P_{2H}$, $\overline{P}_{4H}\overline{G}_{2H}$, respectively. The logic gates 262–266 are employed to generate the function $\overline{G}_{8H}\overline{H}_{2H}+\overline{G}_{8H}\overline{H}_{4H}$. The logic gate 268 generates the function $H_{8H}$. These signals plus the lower order decimal carry and the carry from the first binary bit $C_{1H}$ are employed in the third level of logic gates 270–298 to generate the binary coded decimal sum signals $S_{1H}$, $S_{2H}$, $S_{4H}$, and $S_{8H}$.

Figure 7:
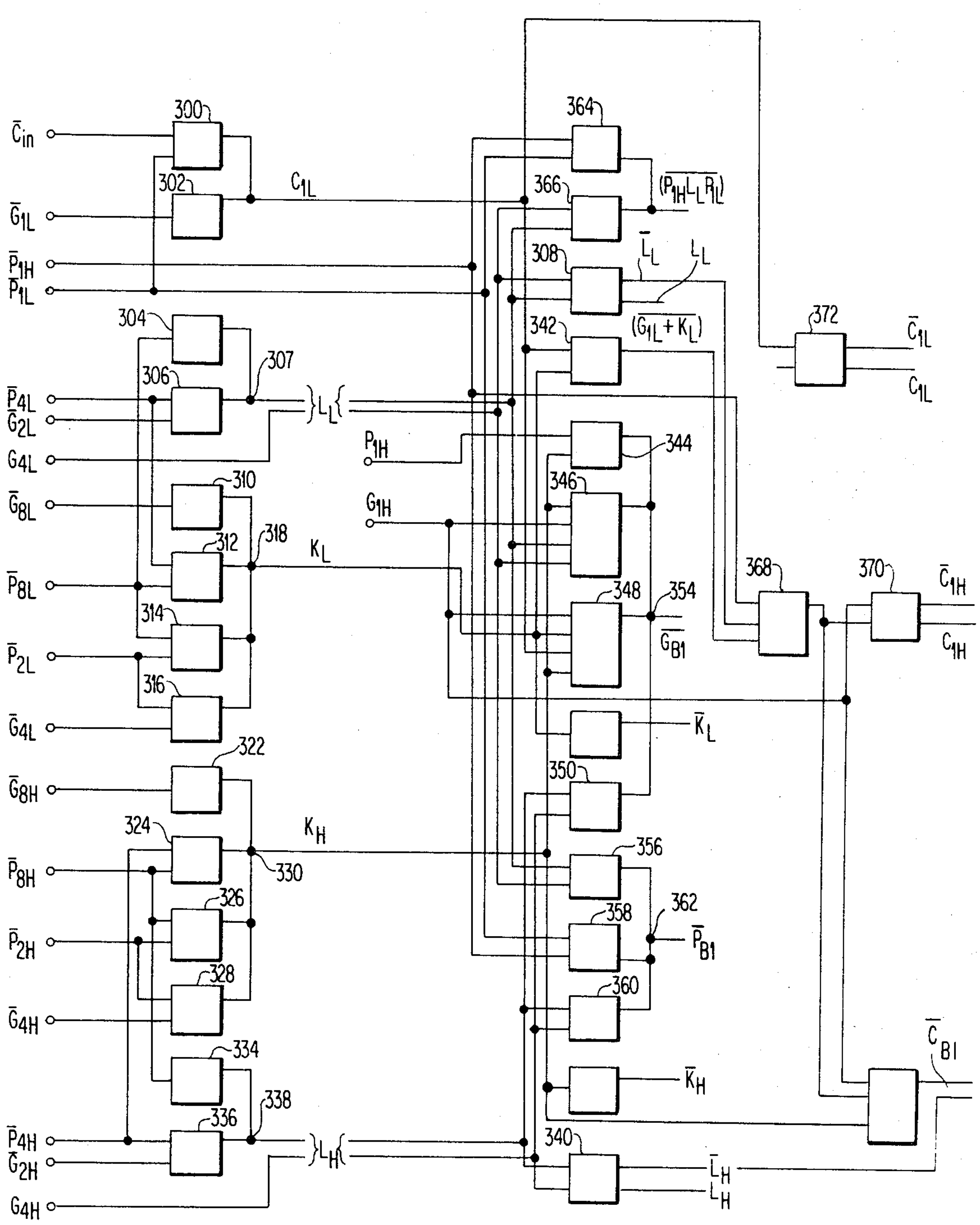
FIGS. 7 through 10 illustrate an implementation of the byte generate and propagate carry signals in a six-logic level, eight-digit decimal adder.

FIGS. 7 through 12 illustrate how the inventive concept employed in the design of the above two-digit decimal adders may be extended to an eight-digit decimal adder. This eight-digit adder generates the decimal sum after six levels of logic and comprises basically four repeated versions of the above described two-digit adders connected in parallel. That is, each eight-digit number is subdivided into four groups of two digits. Hereinafter, each two-digit group is referred to as a byte, the byte containing the lowest order digits is referred to as the first byte and the byte containing the highest order digits is referred to as the fourth byte. FIGS. 7 through 10 illustrate the circuit employed to generate the binary carries $C_i$ for the first bit input values in each decimal digit. Each FIG. refers to only one byte, for example, FIG. 7 illustrates this binary carry generation for the first byte. These binary carries as generated in the first byte of each decimal digit of each byte are then employed to generate the decimal carry from each digit and are thus employed in the generation of the decimal sum as described above by implementing the equation:

$$C_d=L(K+C_1)$$

Figure 11:
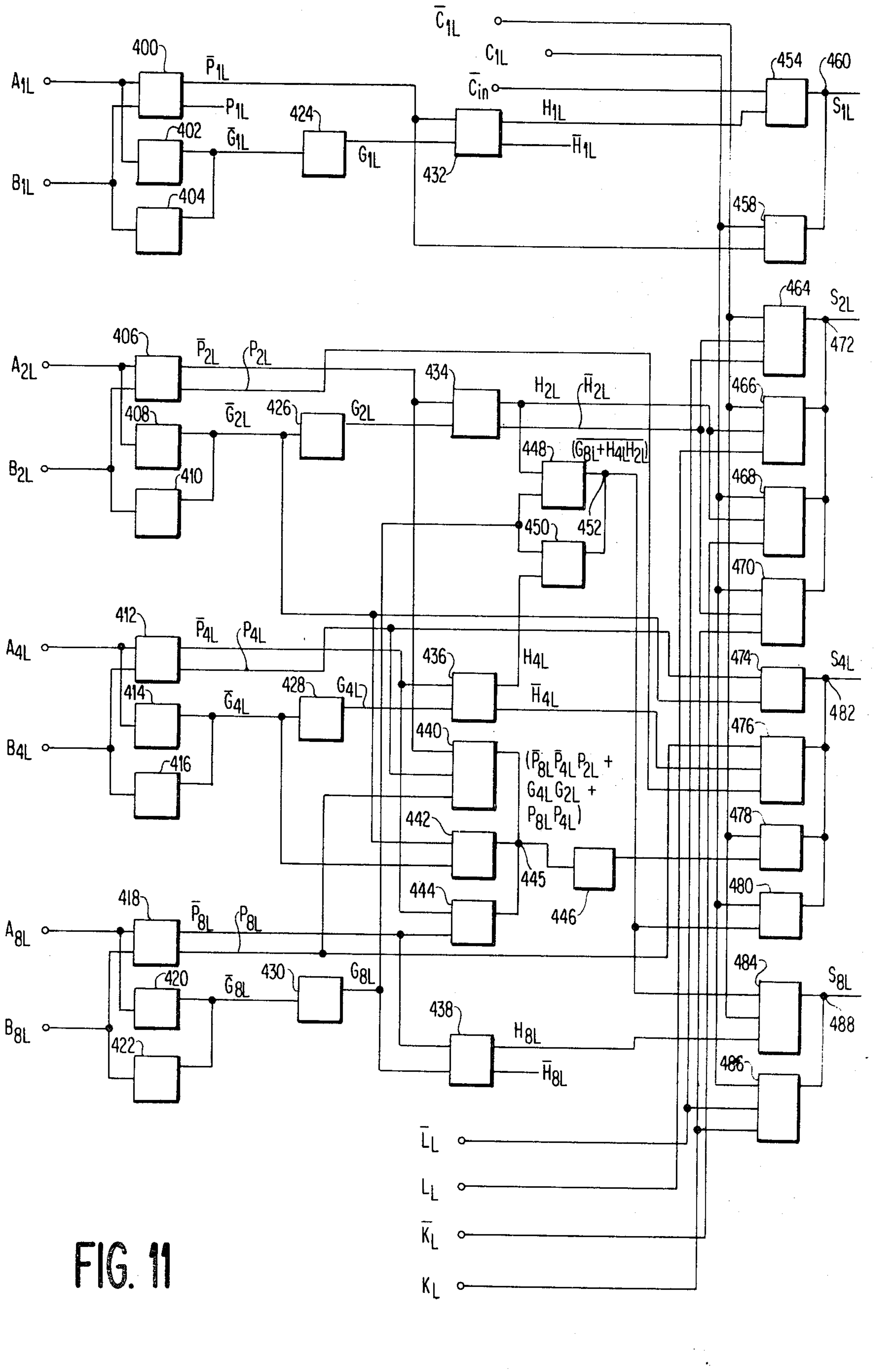
FIG. 11 illustrates a logic implementation of the binary signals representing the decimal sum of the lower order digits in any byte of a six-logic level, eight-digit decimal adder.
Figure 12:
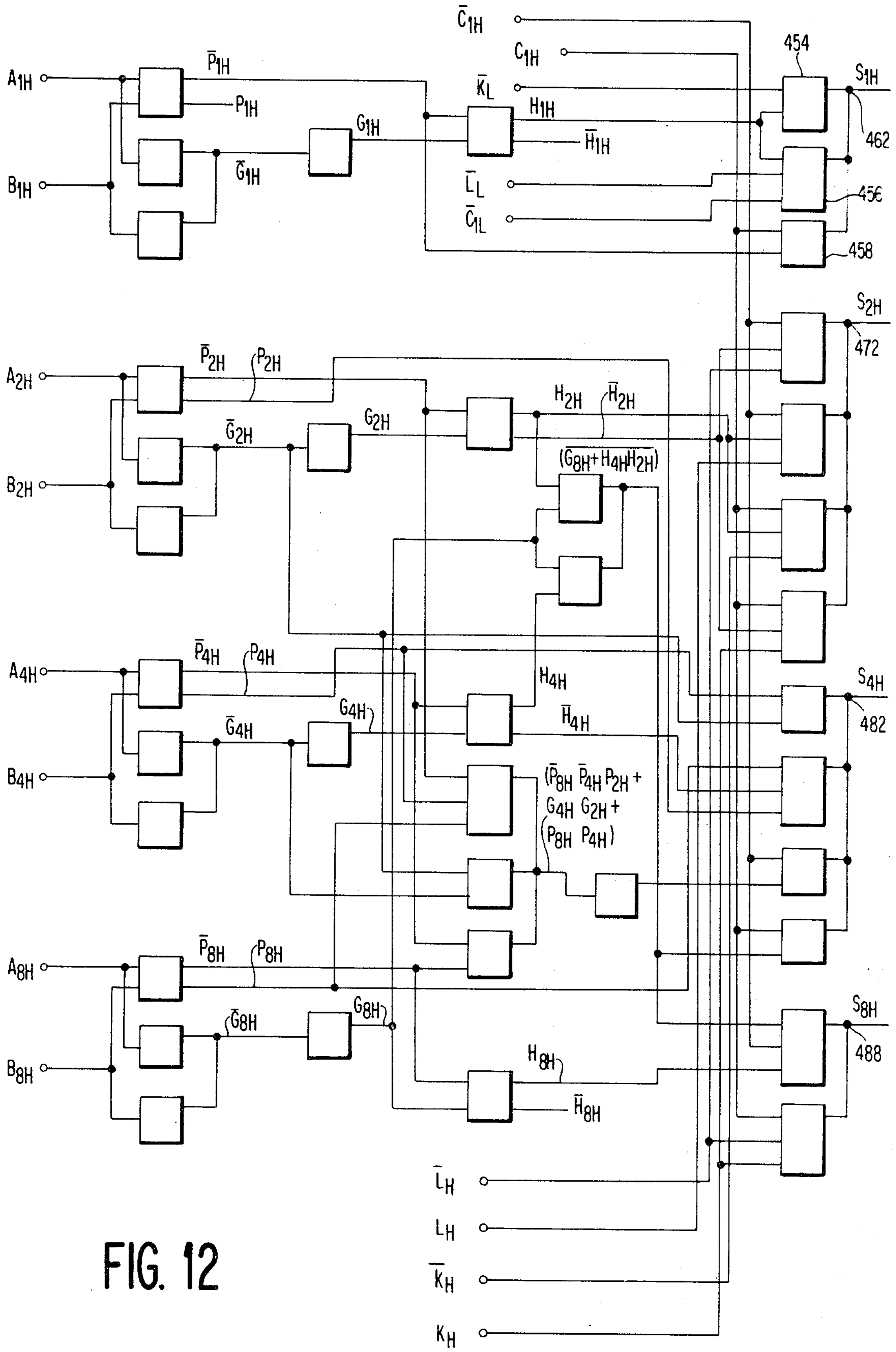
FIG. 12 illustrates a logic implementation of the binary signals representing the decimal sum of the high-order digits in any byte of a six-level, eight-digit decimal adder.

FIG. 11 illustrates the logic circuitry employed to generate the decimal sum of the lower order digits of any byte; therefore, the circuitry as illustrated in FIG. 11 is reproduced four times in actual operation of the eight-digit adder, once for each digit. FIG. 12 illustrates the circuitry employed to generate the binary coded binary signals representative of the decimal sum of the high-order digits of any byte. It also is reproduced four times in the eight-digit adder, once for each byte. As in the above described two-digit adders, the logic gates employed are NOR gates, the top output being the NOR function and the bottom output being the OR function; emitter dotting is also employed.

Because of the increased number of digits, the carry look-ahead technique employed uses group generate and group propagate signals as is well known in parallel binary adders. Here, each group comprises two digits and is referred to as a byte, therefore these signals are referred to as byte generate or propagate signals. The need for these byte generate and propagate signals is well described in an article by M. S. Schmookler, entitled "Microelectronics Opens the Gate to Faster Digital Computer," in Electronic Design, July 5,1966, at page 52. Here, it is shown that in a binary adder the functions for each bit carry are expressed by the following equations:

$C_1=G_1+P_1C_{in}$ $C_2=G_2+P_2C_1=G_2+P_2G_1+P_2P_1C_{in}$ $C_3=G_3+P_3C_2=G_3+P_3G_2+P_3P_2G_1+P_3P_2P_1C_{in}$ $C_4=G_4+P_4C_3=G_4+P_4G_3+P_4P_3G_2+P_4P_3P_2G_1+P_4P_3P_2G_1C_{in}$ where $C_4$ is the carry out of the adder, $P_i$ is the propagate carry signal for each bit, $G_i$ is the generate carry signal for each bit, and $C_{in}$ is the input binary carry. Examining the terms of the expression for $C_4$, this bit has a carry if it generates 1, or if it can propagate it and the third bit generates it, or if the last two bits can propagate it and the second bit generates it, and so on. The last term says that there is a carry from the fourth bit if there is a carry into the first bit and all the intervening stages propagate it. As the adder gets much larger, however, there are three effects prohibiting implementation of the carry functions in the higher stages by this direct manner including, the number of inputs to the circuits soon exceeds feasible limitations, the driving capability of the circuits forming the propagate and generate functions is soon exceeded, and the number of components increases nearly by the square of the number of bits and eventually becomes a limiting factor.

To obviate these difficulties, it is well-known to subdivide parallel binary adders into bytes and propagate and generate the carries between the bytes rather than the individual bits. Auxiliary functions, similar to those defined for the internal carries of a byte, may be defined for the carries between the bytes, for example, a byte generate carry signal $G_b$ and a byte propagate carry signal $P_b$. Therefore, if an adder had two bytes, the byte carries may be represented by the following equations:

$C_{b1}=G_{b1}+P_{b1}C_{in}$ $C_{b2}=G_{b2}+P_{b2}C_{b1}=G_{b2}+P_{b2}G_{b1}+P_{b1}P_{b2}C_{in}$

This well-known technique is used in generating the binary carry $C_i$ of the first bit for each digit in each byte as illustrated in FIGS. 7 through 10.

To apply these byte generate and propagate signals to an eight-digit decimal adder, it must first be noted that each byte comprises two decimal digits in a four-bit binary code. A byte generate signal $G_b$ must be generated whenever there is a decimal carry from the decimal addition performed in the byte. This may occur either if there is a decimal carry from the high-order digit in the byte or a value of 9 in the high-order digit coupled with a carry from the low-order digit. In equation form this may be represented as follows:

$G_b=L_H(K_H+P_{1H})(K_H+G_{1H}+L_L)(K_H+G_{1H}+K_L+G_{1L})$

A byte propagate signal must be generated whenever the two decimal digits will propagate a decimal carry into the byte to the next higher byte, that is, whenever an addition produces the value of nine in each digit of the byte since in this situation, an input carry would be propagated through the byte to the next order byte. This is represented in equation form as follows:

$$P_b=P_{1M}L_LP_{1L}L_H$$

Turning now specifically to FIG. 7 which illustrates the circuitry employed to generate the K and L signals for both the high- and low-order digit, the byte generate $G_b$ and propagate signals $P_b$, and the first bit binary carry $C_1$ for the high- and low-order digits in the first order byte of the eight-digit decimal adder. The K and L functions as described above are defined as follows:

$K=G_8+P_8P_4+P_8P_2+G_4P_8$ $L=P_8+G_4+P_4G_2$

These functions in combination with the first bit binary carry $C_1$ are employed in accordance with the present invention to generate the decimal carry by implementing the equation:

$$C_d=L(K+C_1)$$

and are employed in the circuitry as illustrated in FIGS. 11 and 12 to generate the binary coded signals representing the decimal sum as more fully described below. In addition, the circuitry implements the byte generate signal for the first byte, $G_{b1}$. As described above, this signal is employed in the circuits shown in FIGS. 8 through 10 to generate the first bit binary carry $C_1$ for the higher order bytes. In particular, the operation of the circuit is as follows. The propagate and generate signals for each bit of each digit are generated in the first level of logic as shown in FIGS. 11 and 12 from the input four bit binary coded decimal signals. These signals are thus available to the first column of logic gates shown in FIG. 7 whereby the binary carry from the first bit of the low-order digit $C_{1L}$ and the L and K functions for both the high- and low-order digits in this first byte are generated. The NOR-gates 300 and 302 employ the signals $C_{in}$ and $G_{1L}$ to generate the binary carry for the first bit of the low-order decimal digit according to the equation:

$$C_{1L}=G_{1L}+P_{1L}C_{in}$$

The NOR-gate 304 generates the function $P_{8L}$ and the NOR-gate 306 generates the $P_{4L}G_{2L}$ which are subsequently OR'ed together by the emitter dot 307. The NOR-gate 308 then combines this functions with $G_{4L}$ to produce the $L_L$ function for the low-order digit according to the equation $$L_L=P_{8L}+G_{4L}P_{4L}G_{2L}$$

The NOR-gates 310 through 316 and the emitter dot 318 generate the function $K_L$ according to the equation $$K=G_8+P_8P_4+P_8P_2+G_4P_2$$

Similarly, the OR-gates 322–328 and the emitter dot 330 generate the $K_H$ function for the higher order digit. The NOR-gates 334–336 and the emitter dot 338 generate the function $P_{8H}+G_HP_{4H}$ which is then OR'ed with the function $G_{4H}$ in logic gate 340 to produce the function $L_H$ for the high-order digit according to the equation $$L_H=P_{8H}+G_{4H}+P_{4H}G_{2H}$$

In the second column of logic illustrated in FIG. 7, the logic gate 342 generates the function $\overline{C_{1L}+K_L}$ from the inputs $C_{1L}$ and $K_L$. The logic gates 344–350 and the emitter dot 354 generate the bit generate function for the first bit $G_{b1}$ according to the equation $$G_{b1}=L_H(K_H+P_{1H})(K_H+G_{1H}+L_L)(K_H+G_{1H}+K_L+C_{1L})$$

Figure 8:
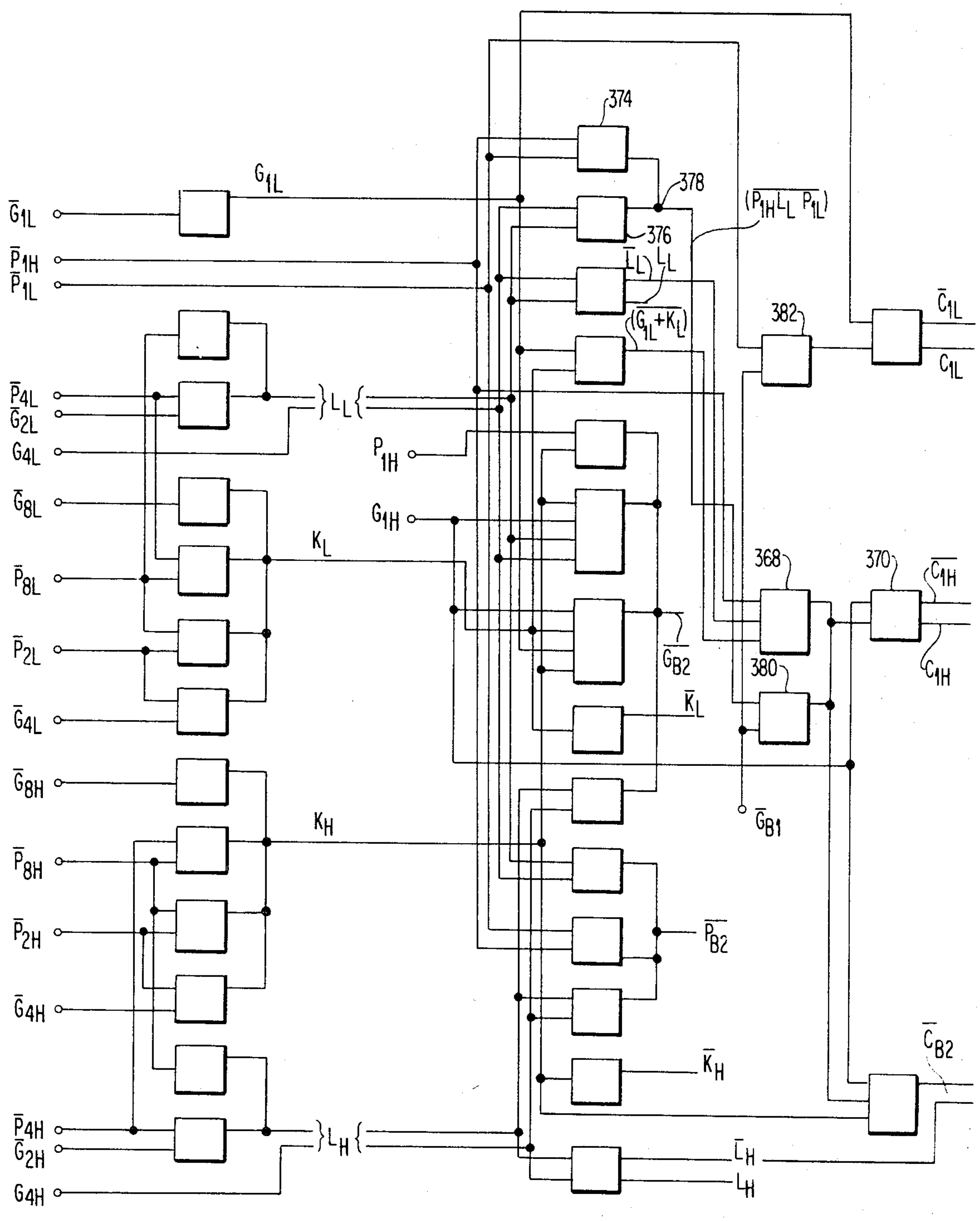
Figure 9:
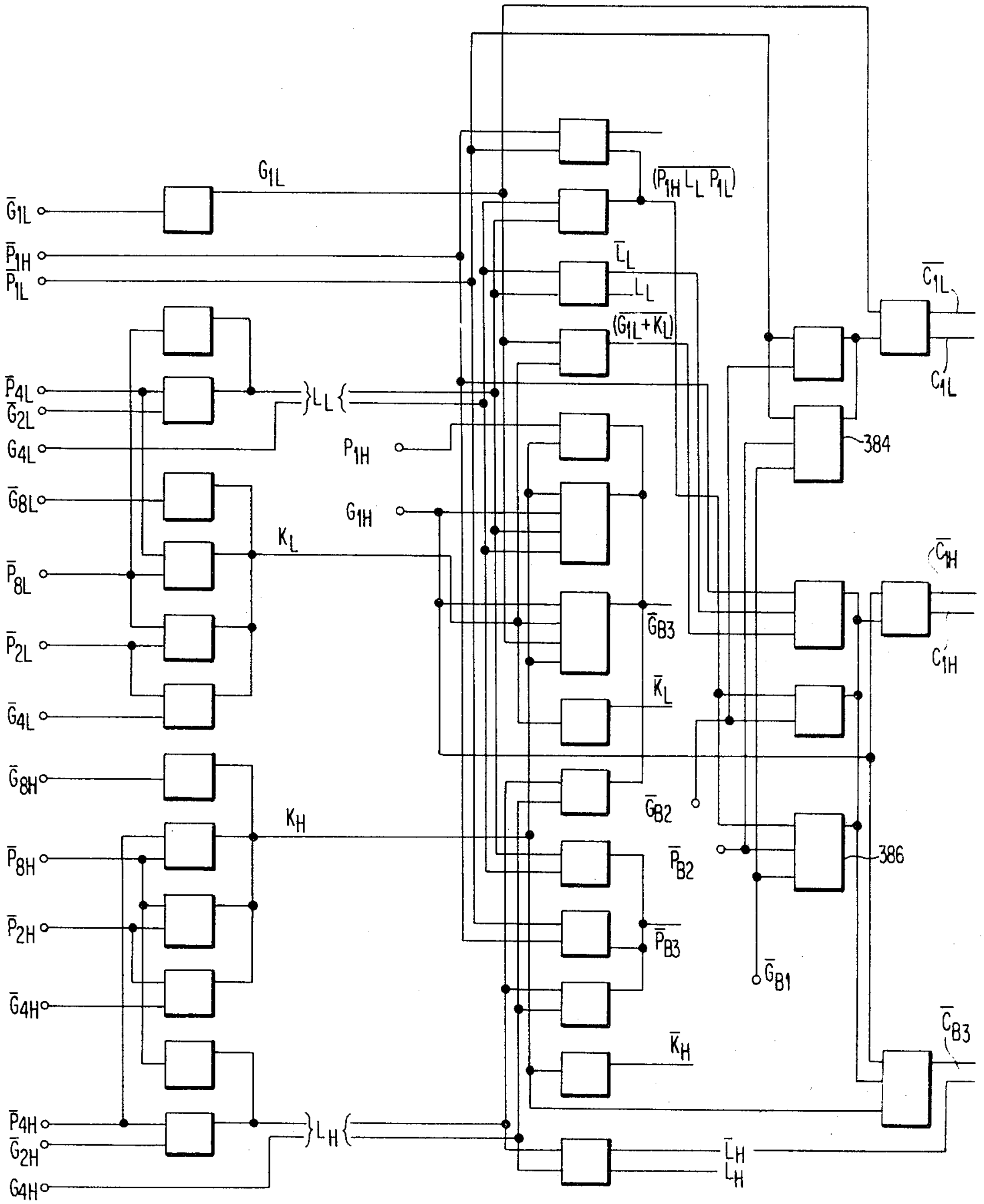
Figure 10:
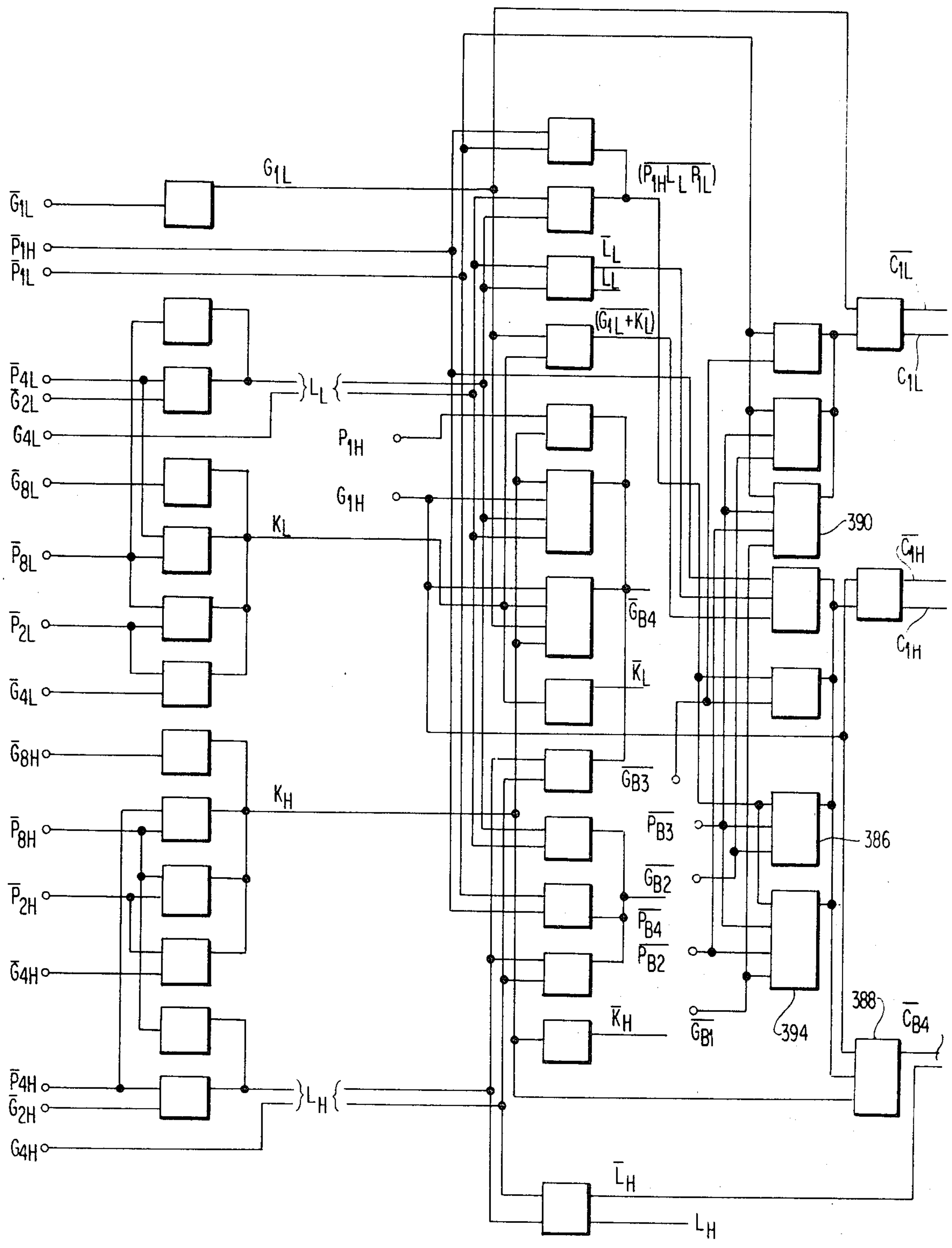

This function is then employed in the circuits shown in FIGS. 8 through 10 to generate the binary carries $C_1$ for the first bit of each decimal in each byte. The logic gates 356–360 and the emitter dot 362 generate the byte propagate signal $P_{b1}$; however, this is not employed since it is not needed. It is only represented here because each byte employs identically manufactured parts and a similar signal is employed in the remaining bytes. This is also true of the logic gates 364 and 366 in their generated signal $\overline{P_{1H}L_LP_{1L}}$. The logic gate 368 in the fourth level of logic illustrated in FIG. 7 generates the function $P_{1H}L_L(C_{1L}+K_L)$. This function is then OR'ed in logic gate 370 with the function $G_{1H}$ to produce the binary carry for the first bit of the high-order decimal digit of the first-order byte $C_{1H}$ according to the equation $$C_{1H}=G_{1H}+P_{1H}L(C_{1L}+K_L)$$

The logic gate 372 merely generates the inverse of the first binary carry $C_{1L}$ from the low-order digit since this has already been generated by the logic gates 300 and 302.

FIG. 8 illustrates the circuitry employed for the next higher order byte, that is, the second byte. Its operation is identical to the operation of FIG. 7 with the following exceptions. The function $\overline{P_{1H}L_LP_{1L}}$ generated by the logic gates 374 and 376 and the emitter dot 378 is now employed with the byte generate signal $G_{b1}$ from the first byte as generated as shown in FIG. 7 as inputs to the additional logic gate 380 to generate the function $G_{b1}(P_{1H}L_LP_{1L})$. This additional generated function is then employed in logic gate 370 to produce the binary carry $C_{1H}$ for the first bit of the high-order decimal digit in this second byte according to the equation $$C_{1H}=C_{1H}+P_{1H}L_L(G_{1L}+K_L)+(P_{1H}L_LP_{1L})G_{b1}$$

Further, since there is no input carry from the lower order digit, the logic gate 300 has been eliminated. The binary carry for the first bit in the lower order decimal digit of this second byte must also employ the byte generated carry $G_{b1}$ from the first byte. This is done by employing an additional logic gate 382 whereby the first bit binary carry $C_{1L}$ is generated according to the equation $$C_{1L}=G_{1L}+P_{1L}G_{b1}$$

FIG. 9 illustrates the circuitry used to implement the bit propagate and generate signals and the first bit binary carry for both the high- and low-decimal digits in the third byte of the eight-decimal adder. This operation is identical to that of the second byte illustrated in FIG. 8 except that additional logic circuits 384 and 386 are employed since the first bit binary carries are now dependent upon both the byte generate and propagate signals generated from both the first and second bytes as described above.

The binary carry in the low-order bit should occur whenever a carry is generated in this bit or a carry is generated from the second byte and a one is propagated in this first bit or the carry has been generated in the first byte and propagated by the second byte and propagated by this first bit. Thus, logic gate 384 allows the byte propagate signal from the second byte to be used in generating the $C_{1L}$ signal according to the equation $$C_{1L}=G_{1L}+P_{1L}G_{b2}+P_{1L}P_{b2}G_{b1}$$

Similarly, a binary carry occurs in the first bit of the high-order decimal digit whenever a carry from the second byte with a value of 9 in the lower digit and a propagate in this bit or a generate from the first byte propagated in the second byte, a 9 in the low-order digit and a propagate in this bit. Thus, logic gate 386 allows the byte generate from the first byte $G_{b1}$ and the byte propagate $P_{b2}$ from the second byte to be employed in generating this binary carry in the first bit of the high-order digit according to the equation $$C_{1H}=G_{1H}+P_{1H}LL_L(G_{1L}+K_L)+(P_{1H}L_LP_{1L})G_{b2}+(P_{1H}L_LP_{1L})P_{b2}G_{b1}$$

FIG. 10 illustrates the logic circuitry employed in the highest order byte, byte number four. Because this is the highest order byte, the byte generate and propagate signals $G_{b4}$ and $P_{b4}$ are not employed since there are no additional stages. Therefore, a decimal carry from the byte is generated by the logic gate 388 according to the equation $$C_{b4}=L_H(K_H+C_{1H})$$

Thus, it represents the decimal carry from the entire addition. Again, since the binary caries from the first bit will be dependent upon the three preceding stages the additional logic gates 390 and 394 are employed. The logic gate 390 allows the binary carry from the first bit in the low-order decimal digit to be generated in accordance with the equation $$C_{1L}=G_{1L}+P_{1L}G_{b3}+P_{1L}P_{b3}G_{b2}+P_{1L}P_{b3}P_{b2}G_{b1}$$

This means that the carry will be generated in the first bit if it is generated in that bit or it is generated in the third byte and propagated by that bit or if it is generated in the second byte propagated by the third byte and propagated by that bit or if it is generated in the first byte propagated by the second byte and propagated by the third byte and propagated in that bit.

The binary carry from the high-order decimal digit is generated in accordance with the equation $$C_{1H}=G_{1H}+P_{1H}L_L(G_{1L}+K_L)+(P_{1H}L_LP_{1L})G_{b3}+(P_{1H}L_LP_{1L})P_{b3}G_{b2}+(AH1\mathrm{H}L_LP_{1L})P_{b3}P_{b2}G_{b1}$$

Thus, a binary carry is generated in the first bit of the high-order digit if it is generated in that bit, or if there is a carry from the lower order digit and it is propagated by the bit or if a carry is generated in the third byte and propagated by the low-order digit and propagated by the bit or generated in the second byte and propagated by the third byte and propagated by the low-order digit and that bit or if it is generated in the first byte propagated in the second byte propagated in the third byte and propagated in the low-order digit and that bit.

FIGS. 11 and 12 illustrate the logic circuitry employed to generate the binary code signals representative of the decimal sum. Only one byte, that is, two digits, are illustrated. In actuality there will be four, each associated with one of the circuits as illustrated in FIGS. 7 through 10; however, they are identical and the explanation of one will suffice.

More specifically, FIG. 11 illustrates the logic circuitry employed to generate the binary coded signals representative of the decimal sum of the lower-order digit in one of the four bytes. In operation, the decimal numbers as coded in four-bit binary signals are inputs to the logic gates comprising the first column of logic. The logic gates 400–404 accept the first bit values of the low-order digit and generate the propagate and generate signals for this bit was as described in the discussion of the two-digit adders above according to the equations $$G_{1L}=A_{1L}B_{1L}$$
$$P_{1L}=A_{1L}+B_{1L}$$

The logic gates 406–422 similarly generate these functions for the remaining bits in the low-order digit. The logic gates 424 through 430 in the second level of logic merely invert the $\overline{G}$ functions to the positive G functions. The logic gates 432–438 in the third level of logic generate the half-sum signals of each bit from the G and P functions according to the equation $$H_i=\bar A_iB_i+A_i\bar B_i=\bar G_iP_i$$

The logic gates 440–444 and the emitter dot 445 generate the function $P_{8L}P_{4L}P_{2L}+G_{4L}G_{2L}+P_{8L}P_{4L}$ and the logic gate 446 merely inverts this function. The logic gates 448–450 and the emitter dot 452 generate the function $\overline{G_8+H_4H_2}$. The logic gates 454–458 and the emitter dot 460 employ the input carry signals $C_{in}$, the binary carry from the first bit of the low-order digit as generated in a circuit as shown in FIG. 7 and the half-sum signal from the first bit as generated by the logic gate 432 to generate the binary signal $S_{1L}$ which represents the first bit of the binary coded decimal addition according to the equation $$S_{1L}=\bar H_{1L}C_{in}+P_{1L}\bar C_{1L}$$

For the low-order byte, $C_{in}$ is the actual input carry to the adder. For the higher order bytes, $C_{in}$ is the byte carry $C_b$ generated in the next lower order byte.

The logic gates 464–470 and the emitter dot 472 are used to generate the second bit signal of the low-order digit $S_{2L}$ from the inputs $C_{1L}$, $L_L$, and $K_L$ generated from a circuit shown in FIG. 7 and the half-sum signal from this bit $H_{2L}$ as generated in logic gate 434 according to the equation $$S_{2L}=H_{2L}L_LC_{1L}+\bar H_{2L}\bar L_LC_{1L}+\bar H_{2L}K_L\bar C_{1L}+H_{2L}\bar K_L\bar C_{1L}$$

The logic gates 474–480 and the emitter dot 482 generate the four-order binary bit of the low-order digit from the inputs $C_{1L}$ as generated in the circuit as illustrated in FIG. 7, the half-sum signal for this bit $H_{4L}$, the signals $G_{2L}P_{2L}$, $P_{4L}$, the output of emitter dot 452, and the output from logic gate 446, according to the equation $$S_{4L}=\bar P_{4L}G_{2L}+\bar P_{8L}H_{4L}\bar P_{2L}+(\bar P_{8L}\bar P_{4L}P_{2L}+G_{4L}G_{2L}+P_{8L}P_{4L})C_{1L}+(G_{8L}+H_{4L}H_{2L})\bar C_{1L}$$

The logic gates 484 and 486 and the emitter dot 488 generate the eight-order bit signal for the low-order digit from the $C_{1L}$, $L_L$ and $K_L$ signals as generated in a circuit as illustrated in FIG. 7 and the H signals from the two-, four- and eight-order bits and the eight-order generate signal according to the equation $$S_{8L}=(G_{8L}+H_{4L}H_{2L})\bar H_{8L}C_{1L}+L_L\bar K_L\bar C_{1L}$$

FIG. 12 illustrates the circuitry to generate the binary bit signals representative of the decimal sum of the high-order digit of any byte, that is, any two digits. Thus, the circuit shown in FIG. 12, as in FIG. 11, is associated with one of the byte circuits as illustrated in FIGS. 7 through 10. Its operation is identical to that shown in FIG. 11 for the low-order digit except for the generation of the first binary bit signal since, with a high-order digit, there is not input carry; however, there may be a carry from the low-order digit. Therefore, the first bit binary signal $S_{1H}$ is generated according to the equation $$S_{1H}=\overline{H}_{1H}K_L+\overline{H}_{1H}L_LC_{1L}+P_{1H}\overline{C}_{1H}$$

by the logic gates 454–458 and the emitter dot 462.

While this invention has been particularly shown and described with reference to a preferred embodiment thereof, it will be understood by those skilled in the art that various changes in form and details may be made wherein without departing from the spirit and scope of the invention.

What is claimed is:

1. A method for performing decimal addition in a logic system including a plurality of logic circuits, wherein the augend and the addend each are represented in a four-bit binary code and said logic system has a low-order input carry signal $C_{in}$, comprising:
   a. logically producing a propagate signal $P_i$ for each bit of said binary coded inputs where $P_i=A_i+B_i$ and $A_i$ and $B_i$ are the binary coded bit values of the augend and addend, respectively, of any bit $i$ of the four bits;
   b. logically producing a generate signal $G_i$ for each bit $i$ of said binary coded inputs where $G_i=A_iB_i$;
   c. logically producing a binary carry signal $C_1$ from the input values comprising the first bit of said binary coded bit values and said input carry signal where $C_1=G_1+P_1C_{in}$;
   d. logically producing a decimal carry signal for said decimal addition from said propagate signals, said generate signals, and said binary carry of the first bit; and
   e. generating binary signals representative of the decimal sum of said augend and addend from said propagate signals, said generate signals, and said decimal carry signal, whereby the said decimal sum is represented at the output of said logic system for by four-bit coded signals and said decimal carry signal.

2. The method of claim 1 wherein said step for producing said decimal carry signal comprises logically solving the equation $C_d=K+LC_1$, or its logical equivalent where $C_d$ is said decimal carry, $C_1$ is said binary carry of the first bit, $K=G_8+P_8P+P_8P_2+G_4P_2$, and $L=P_8+G_4+P_4G_2$.

3. The method of claim 1 wherein said step of generating binary signals representative of the decimal sum includes the step of generating a half-sum signal $H_i$ for each bit where $H_i=A_iB_iA_iB_i$.

4. The method of claim 3 wherein said step for generating binary signals representative of the decimal sum further comprises logically solving the following equations or their logical equivalents:
   a. $S_1=(\overline{H}_1+\overline{C}_{in})C_{in}+P_1\overline{C}_1$ where $S_1$ is the binary coded output signal for the first bit;
   b. $S_2=\overline{H}_2\overline{C}_1C_d+H_2C_1C_d+\overline{H}_2C_1\overline{C}_d+H_2\overline{C}_1\overline{C}d$ or $S_2=H_2LC_1+\overline{H}_2\overline{L}C+\overline{H}_2\overline{K}C_1+H_2\overline{KC}_1$ where $S_2$ is the binary coded output signal $K=G_8+P_8P_4+G_4P_2$, and $L=P_8+G_4+P_4G_2$ for the second bit;
   c. $S_4=\overline{P}_4G_2+\overline{P}_8H_4\overline{P}_2+\overline{P}_8\overline{H}_4(\overline{P}_4+G_2)P_2C_1+P_8H_4C_1+(H_4H_2+G_8)\overline{C}_1$ or $S_4=\overline{P}_8\overline{G}_4(\overline{P}_4+\overline{P}_2)(P_4+G_2)+\overline{P}_8\overline{P}_4P_2C_1+G_4G_2C_1+P_8P_4C_1+(G_8+H_2)(G_8+H_4)\overline{C}_1$ where $S_4$ is the binary coded output signal for the third bit;
   d. $S_8=\overline{H}_8(H_4H_2+G_8)C_1+L\overline{C}_d$ or $S_8=\overline{H}_8(H_4H_2+G_8)C_1+L\overline{KC}_1$ where $S_8$ is the binary coded output signal for the fourth bit; whereby, $S_1$, $S_2$, $S_4$, and $S_8$ represent the sum of the decimal addition in said four-bit binary code and $C_d$ represents the decimal carry signal emanating from this decimal digit.

5. A logic system for preforming decimal addition, wherein an augend and an addend each are represented in a four-bit binary code and said logic system receives a low-order input carry signal $C_{in}$, comprising:
   a. logic means for implementing a propagate signal $P_i$ for each bit of said binary coded inputs where $P_i=A_i+B_i$ and $A_i$ and $B_i$ are the binary coded bit values of the augend and addend, respectively, of any bit $i$ of the four bits;
   b. logic means for implementing a generate signal $G_i$ for each bit $i$ of said binary coded inputs where $G_i=A_iB_i$;
   c. logic means for implementing a binary carry signal $C_1$ from the input values comprising the first bits of said binary coded bit values and said input carry signals where $C_1=G_1+P_1C_{in}$;
   d. logic means for implementing the decimal carry signal for said decimal addition from said propagate signals, said generated signals, said binary carry of the first bit; and
   e. logic means for generating binary signals representative of the decimal sum of said augend and addend from said propagate signals, said generate signals, and said decimal carry signal, whereby said decimal sum is represented at the output of said logic system by four-bit binary coded signals and said decimal carry signal.

6. The logic system of claim 5 wherein said means for implementing said decimal carry signal comprises means to logically solve the equation $C_d=K+LC_1$ or its logical equivalent, where $C_d$ is said decimal carry signal, $C_1$ is said binary carry from the first bit, $K=G_8+P_8P_4+P_8P_2+G_4P_2$, and $L=P_8+G_4+P_4G_2$.

7. The logic system of claim 5 wherein said logic means for generating binary signals representative of the decimal sum includes means for generating a half-sum signal $H_i$ for each bit where $H_i=\overline{A}_iB_i+A_i\overline{B}_i$.

* * * * *